US010763516B2

(12) United States Patent
Tanimura et al.

(10) Patent No.: US 10,763,516 B2
(45) Date of Patent: Sep. 1, 2020

(54) INTERCONNECTOR-ELECTROCHEMICAL REACTION SINGLE CELL COMPOSITE BODY, AND ELECTROCHEMICAL REACTION CELL STACK

(71) Applicant: MORIMURA SOFC TECHNOLOGY CO., LTD., Komaki-shi, Aichi (JP)

(72) Inventors: Ryoji Tanimura, Nagoya (JP); Masaaki Murase, Kasugai (JP)

(73) Assignee: MORIMURA SOFC TECHNOLOGY CO., LTD., Komaki-shi, Aichi (JP)

( * ) Notice: Subject to any disclaimer, the term of this patent is extended or adjusted under 35 U.S.C. 154(b) by 42 days.

(21) Appl. No.: 15/769,016

(22) PCT Filed: Oct. 13, 2016

(86) PCT No.: PCT/JP2016/080338
§ 371 (c)(1),
(2) Date: Apr. 17, 2018

(87) PCT Pub. No.: WO2017/069033
PCT Pub. Date: Apr. 27, 2017

(65) Prior Publication Data
US 2018/0323446 A1    Nov. 8, 2018

(30) Foreign Application Priority Data

Oct. 23, 2015   (JP) ................................ 2015-208834

(51) Int. Cl.
*H01M 8/2425* (2016.01)
*H01M 8/0228* (2016.01)
(Continued)

(52) U.S. Cl.
CPC ............. *H01M 8/0202* (2013.01); *C25B 1/10* (2013.01); *C25B 9/206* (2013.01);
(Continued)

(58) Field of Classification Search
None
See application file for complete search history.

(56) References Cited

U.S. PATENT DOCUMENTS

2006/0099442 A1*   5/2006   Tietz ......................... C23C 8/02
                                                                        428/640
2012/0159952 A1    6/2012   Arikawa et al.
(Continued)

FOREIGN PATENT DOCUMENTS

| JP | 2003-89574 A | 3/2003 |
|---|---|---|
| JP | 2006-107862 A | 4/2006 |

(Continued)

OTHER PUBLICATIONS

English translation of JP2007294245 (Year: 2007).*
(Continued)

*Primary Examiner* — Yoshitoshi Takeuchi
(74) *Attorney, Agent, or Firm* — Sughrue Mion, PLLC (57) ABSTRACT

An interconnector-electrochemical reaction unit cell composite body including an electrochemical reaction unit cell, and an interconnector which has a first through hole defining a fuel gas flow channel and which is disposed on the side toward an anode of the electrochemical reaction unit cell. The interconnector includes a coating forming a first surface of the interconnector opposite the anode. The coating includes a first coating and a second coating a having reduction resistance higher than that of the first coating. The first coating forms a first surface region which is a portion of the first surface of the interconnector and which is located away from the first through hole. The second coating forms a second surface region which is a portion of the first surface of the interconnector, which surrounds the first through hole, and which is located between the first coating and the first through hole.

5 Claims, 8 Drawing Sheets

(51) Int. Cl.
| | |
|---|---|
| *H01M 8/0202* | (2016.01) |
| *H01M 8/0271* | (2016.01) |
| *C25B 1/10* | (2006.01) |
| *H01M 8/2432* | (2016.01) |
| *C25B 9/20* | (2006.01) |
| *H01M 8/12* | (2016.01) |
| *H01M 8/24* | (2016.01) |
| *H01M 8/021* | (2016.01) |
| *H01M 8/18* | (2006.01) |
| *H01M 8/124* | (2016.01) |

(52) U.S. Cl.
CPC ....... *H01M 8/0228* (2013.01); *H01M 8/0271* (2013.01); *H01M 8/12* (2013.01); *H01M 8/24* (2013.01); *H01M 8/2432* (2016.02); *H01M 8/021* (2013.01); *H01M 8/18* (2013.01); *H01M 2008/1293* (2013.01)

(56) References Cited

U.S. PATENT DOCUMENTS

| | | | |
|---|---|---|---|
| 2013/0130146 A1* | 5/2013 | Batawi | H01M 8/0215 429/460 |
| 2013/0230644 A1 | 9/2013 | Armstrong et al. | |
| 2014/0295308 A1 | 10/2014 | Tsuga et al. | |

FOREIGN PATENT DOCUMENTS

| | | | | |
|---|---|---|---|---|
| JP | 2006-107936 A | 4/2006 | | |
| JP | 2007-268560 A | 10/2007 | | |
| JP | 2007-294245 A | 11/2007 | | |
| JP | 2007294245 | * 11/2007 | ............. | H01M 8/02 |
| JP | 2009-43550 A | 2/2009 | | |
| JP | 2012-137073 A | 7/2012 | | |

OTHER PUBLICATIONS

Communication dated May 15, 2019, issued by the European Patent Office in counterpart European Application No. 16857348.3.
Communication issued by the Japanese Patent Office dated Dec. 5, 2017 in counterpart Japanese Patent Application No. 2017-517127.
International Search Report issued by the International Searching Authority dated Dec. 27, 2016 in counterpart International Patent Application No. PCT/JP2 016/080338 (PCT/ISA/210).
Written Opinion issued by the International Searching Authority dated Dec. 27, 2016 in counterpart International Patent Application No. PCT/JP2 016/080338 (PCT/ISA/237).

* cited by examiner

INTERCONNECTOR-ELECTROCHEMICAL REACTION SINGLE CELL COMPOSITE BODY, AND ELECTROCHEMICAL REACTION CELL STACK

CROSS REFERENCE TO RELATED APPLICATIONS

This application is a National Stage of International Application No. PCT/JP2016/080338 filed Oct. 13, 2016, claiming priority based on Japanese Patent Application No. 2015-208834 filed Oct, 32, 2015.

TECHNICAL FIELD

A technique disclosed in the present specification relates to an interconnector-electrochemical reaction unit cell composite body.

BACKGROUND ART

A known type of a fuel cell for generating electricity by utilizing electrochemical reaction between hydrogen and oxygen is a solid oxide fuel cell (hereinafter may be referred to as "SOFC") which includes electrolyte layers containing a solid oxide. In general, an SOFC is used in the form of a fuel cell stack including a plurality of interconnector-fuel cell unit cell composite bodies (hereinafter may be referred to simply as "composite bodies") that are disposed in a predetermined direction (hereinafter referred to as a "first direction"). Each composite body includes a unit cell of a fuel cell (hereinafter may be referred to simply as a "unit cell") and an interconnector. The unit cell includes an electrolyte layer, a cathode, and an anode such that the cathode and the anode face each other in the first direction and the electrolyte layer intervenes between these electrodes. The interconnector is disposed on the anode side of the unit cell and has a through hole defining a fuel gas flow channel.

In a known technique relating to such a fuel cell stack, a sealing member forming the aforementioned fuel gas flow channel is disposed between a surface (hereinafter referred to as a "first surface") of the interconnector of a first composite body (the first surface is opposite the surface of the interconnector facing the anode) and a second composite body disposed so as to face the first surface, thereby sealing a cathode chamber facing the cathode of the second composite body (see, for example, Patent Document 1).

In another known technique, a coating is formed on the first surface of an interconnector opposite the surface facing the anode for preventing diffusion of Cr (chromium) contained in the interconnector (see, for example, Patent Document 2).

PRIOR ART DOCUMENT

Patent Document

Patent Document 1: Japanese Patent. Application Laid-Open (kokai) No. 2009-43550
Patent Document. 2: Japanese Patent Application Laid-Open (kokai) No. 2006-107936

SUMMARY OF THE INVENTION

Problem to be Solved by the Invention

The aforementioned coating forming the first surface of the interconnector faces the cathode chamber and is exposed to an oxidative atmosphere. In general, the material used for formation of the coating is selected in consideration of oxidation resistance, but the reduction resistance of the material is not sufficiently taken into account. In the aforementioned fuel cell stack including the interconnector having the first surface entirely covered with the coating, the coating is exposed to a fuel gas flow channel through a gap between the interconnector and a sealing member. Thus, the coating may become porous due to reduction reaction between the coating and a fuel gas flowing through the fuel gas flow channel, resulting in impairment of the sealing performance of the fuel gas flow channel.

Such a problem is common with an electrolysis cell stack composed of a plurality of interconnector electrolysis cell composite bodies each including an interconnector and a solid oxide electrolysis cell (hereinafter may be referred to as "SOEC") for generating hydrogen by utilizing electrolysis of water. In the present specification, an interconnector-fuel cell unit cell composite body and an interconnector-electrolysis cell composite body are collectively referred to as an "interconnector-electrochemical reaction unit cell composite body," and a fuel cell stack and an electrolysis cell stack are collectively referred to as an "electrochemical reaction cell stack."

The present specification discloses a technique capable of at least partially solving the aforementioned problems.

Means for Solving the Problem

A technique disclosed in the present specification can be implemented in the following modes.

(1) An interconnector-electrochemical reaction unit cell composite body disclosed in the present specification comprises an electrochemical reaction unit cell including an electrolyte layer, and a cathode and an anode which face each other in a first direction with the electrolyte layer intervening therebetween; and an interconnector which has a first through hole defining a fuel gas flow channel and which is disposed on the anode side of the electrochemical reaction unit cell, the interconnector-electrochemical reaction unit cell composite body being characterized in that the interconnector includes a coating forming a first surface of the interconnector, the first surface being located on a side of the interconnector opposite the anode; and the coating includes a first coating and a second coating having reduction resistance higher than that of the first coating, the first coating forming a first surface region which is a portion of the first surface of the interconnector and is located away from the first through hole, the second coating forming a second surface region which is a portion of the first surface of the interconnector, surrounds the first through hole, and is located between the first coating and the first through hole. According to the present interconnector-electrochemical reaction unit cell composite body, the second coating, which has reduction resistance higher than that of the first coating, is disposed over the entire periphery of the fuel gas flow channel and is located between the fuel gas flow channel and the first coating, which forms the first surface region of the interconnector facing the cathode of an adjacently disposed interconnector-electrochemical reaction unit celi composite body. This configuration can prevent impairment of the sealing performance of the fuel gas flow channel, which would otherwise occur due to reduction reaction between the first coating and a fuel gas.

(2) The interconnector-electrochemical reaction unit cell composite body may be configured such that the interconnector has a second through hole defining an oxidizer gas flow channel, and the first surface region includes a surface region surrounding the second through hole. According to the present interconnector-electrochemical reaction unit cell composite body, the area of the region of the second coating can be reduced as compared with the case where the second coating forms a surface region surrounding the second through hole.

(3) The interconnector-electrochemical reaction unit cell composite body may be configured such that the second coating contains chromia.

(4) The interconnector-electrochemical reaction unit cell composite body may be configured such that the electrolyte is formed of a solid oxide.

(5) An electrochemical reaction cell stack disclosed in the present specification comprises a plurality of interconnector-electrochemical reaction unit cell composite bodies disposed in a first direction; and a sealing member which forms the fuel gas flow channel and which is disposed between the interconnector of one of two adjacent interconnector-electrochemical reaction unit cell composite bodies among the plurality of interconnector-electrochemical reaction unit cell composite bodies and the other interconnector-electrochemical reaction unit cell composite body, the electrochemical reaction cell stack being characterized in that at least one of the interconnector-electrochemical reaction unit cell composite bodies is an interconnector-electrochemical reaction unit cell composite body as recited in any one of (1) to (4) above, and the outer peripheral contour of the second coating is located inward of the outer peripheral contour of the sealing member as viewed in the first direction. Since the outer peripheral contour of the second coating is located inward of the outer peripheral contour of the sealing member, the second coating is prevented from being exposed to the cathode chamber. This configuration can prevent adverse effects by exposure of the second coating to the cathode chamber; for example, impairment of electrochemical reactivity.

(6) The electrochemical reaction cell stack may be configured such that the inner peripheral contour of the first coating is located outward of the inner peripheral contour of the sealing member as viewed in the first direction. Since the inner peripheral contour of the first coating is located outward of the inner peripheral contour of the sealing member, separation of the first coating, which would otherwise occur if the first coating is located inward of the inner peripheral contour of the sealing member, can be prevented.

(7) An electrochemical reaction cell stack disclosed in the present specification comprises a plurality of interconnector-electrochemical reaction unit cell composite bodies disposed in a first direction; and a sealing member which forms the fuel gas flow channel and which is disposed between the interconnector of one of two adjacent interconnector-electrochemical reaction unit cell composite bodies among the plurality of interconnector-electrochemical reaction unit cell composite bodies and the other interconnector-electrochemical reaction unit cell composite body, the electrochemical reaction cell stack being characterized in that at least one of the interconnector-electrochemical reaction unit cell composite bodies is an interconnector-electrochemical reaction unit cell composite body as recited in any one of (1) to (4) above, and the inner peripheral contour of the first coating is located outward of the inner peripheral contour of the sealing member as viewed in the first direction. Since the inner peripheral contour of the first coating is located outward of the inner peripheral contour of the sealing member, separation of the first coating, which would otherwise occur if the first coating is located inward of the inner peripheral contour of the sealing member, can be prevented.

(8) The electrochemical reaction cell stack may be configured such that the electrochemical reaction unit cell included in each of the interconnector-electrochemical reaction unit cell composite bodies is a fuel cell unit cell.

The technique disclosed in the present specification can be implemented in various modes; for example, an interconnector-electrochemical reaction unit cell composite body (interconnector-fuel cell unit cell composite body) including an electrochemical reaction unit cell (fuel cell unit cell or electrolysis cell) and an interconnector, an electrochemical reaction cell stack (fuel cell stack or electrolysis cell stack) including a plurality of interconnector-electrochemical reaction unit cell composite bodies, and a production method therefor.

MODES FOR CARRYING OUT THE INVENTION

A. First Embodiment

Figure 1:
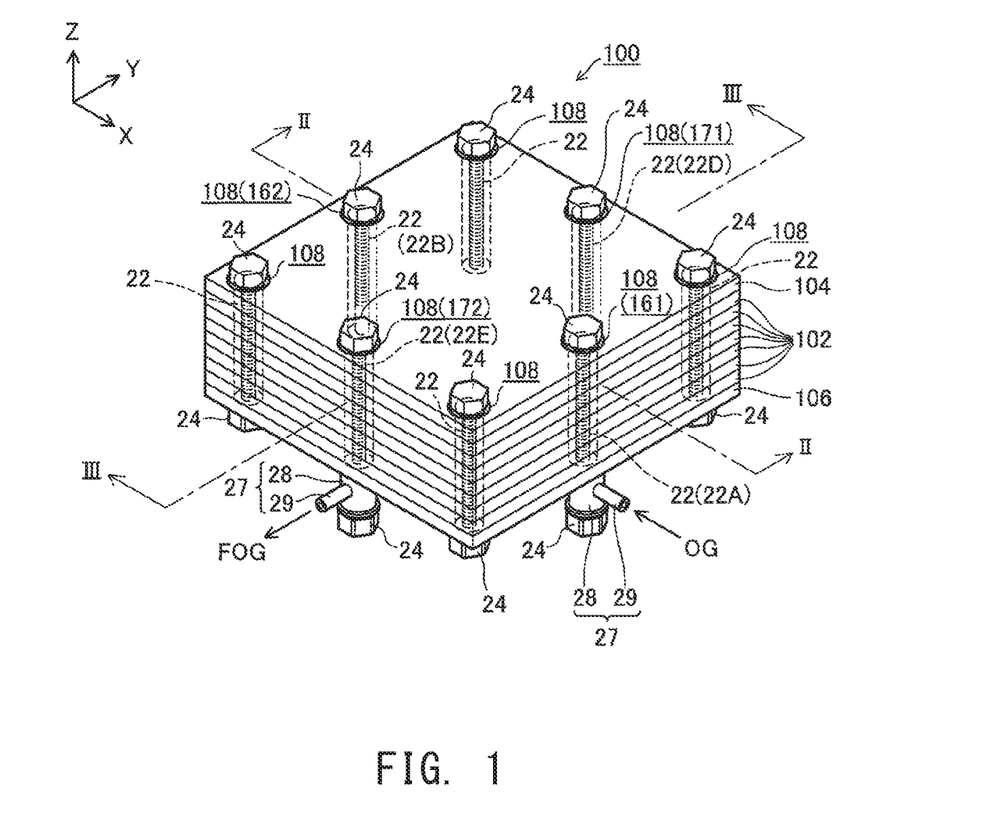
FIG. 1 Perspective view showing the external appearance of a fuel cell stack 100 according to a first embodiment.
Figure 2:
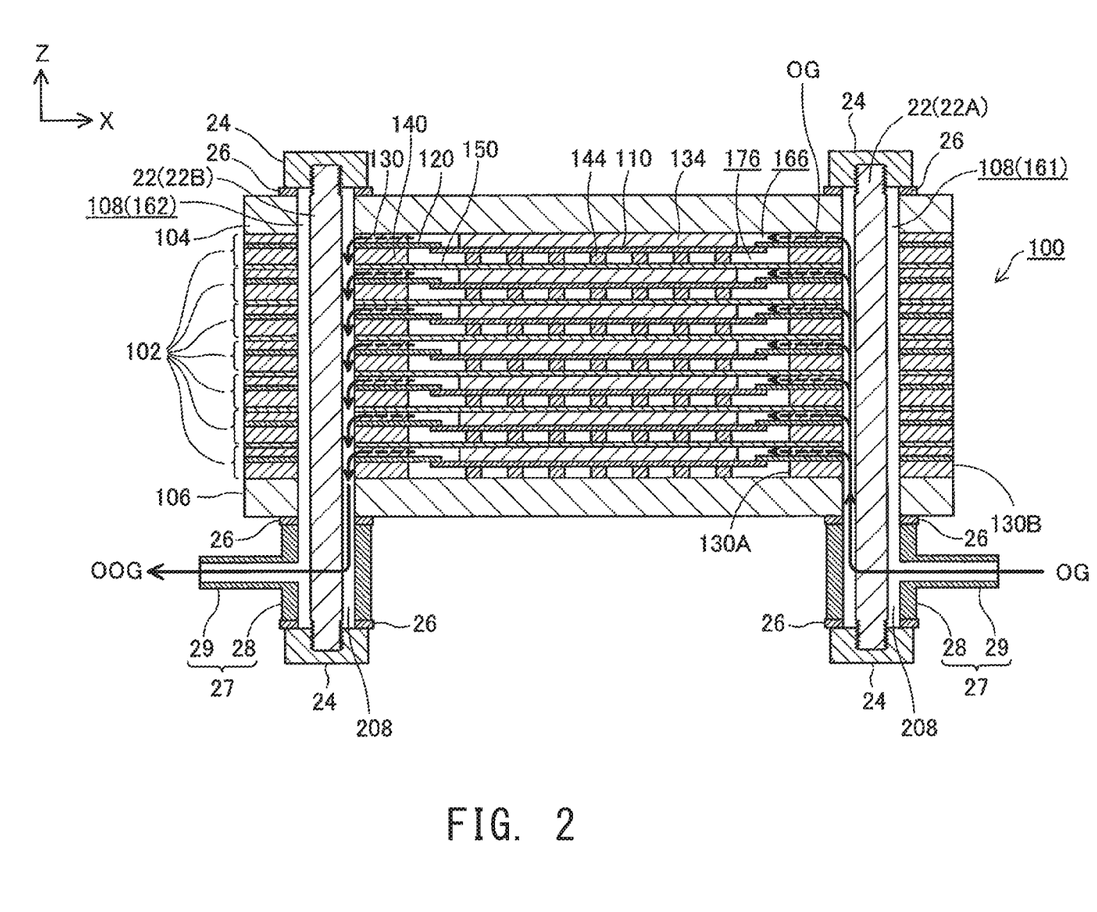
FIG. 2 Explanatory view showing an XZ section of the fuel cell stack 100 taken along line II-II of FIG. 1.
Figure 3:
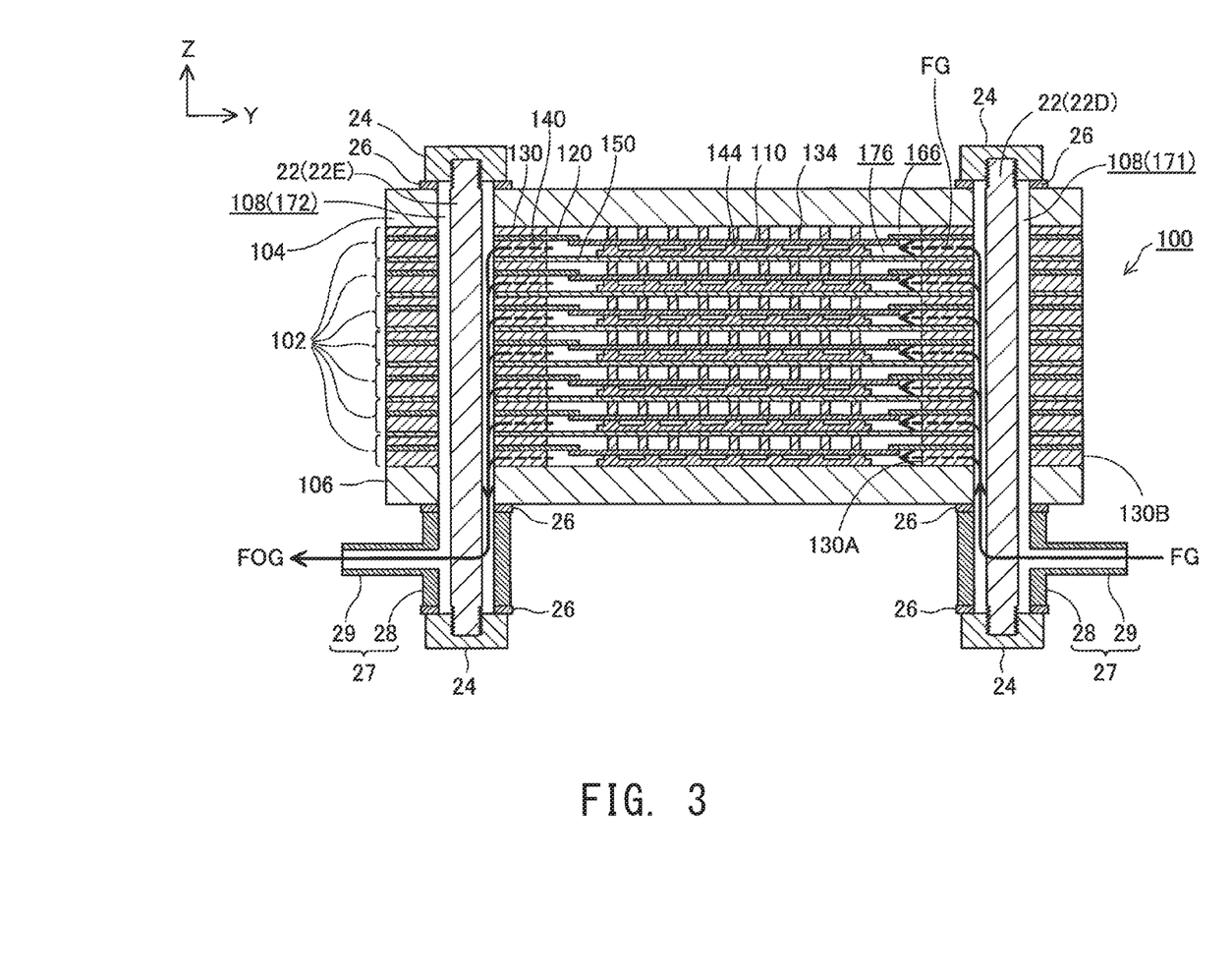
FIG. 3 Explanatory view showing a YZ section of the fuel cell stack 100 taken along line III-III of FIG. 1.

A-1. Structure:
(Structure of Fuel Cell Stack 100)
FIG. 1 is a perspective view showing the external appearance of a fuel cell stack 100 according to the present embodiment; FIG. 2 is an explanatory view showing an XZ section of the fuel cell stack 100 taken along line II-II of FIG. 1; and FIG. 3 is an explanatory view showing a YZ section of the fuel cell stack 100 taken along line III-III of FIG. 1. FIGS. 1 to 3 show mutually orthogonal X-axis, Y-axis, and Z-axis for specifying directions. In the present specification, for the sake of convenience, the positive Z-axis direction is called the "upward direction" and the negative Z-axis direction is called the "downward direction"; however, in actuality, the fuel cell stack 100 may be disposed in a different orientation. The same also applies to FIG. 4 and subsequent drawings.

The fuel cell stack 100 includes a plurality of (seven in the present embodiment) of electricity generation units 102 and a pair of end plates 104 and 106. The seven electricity generation units 102 are disposed in a predetermined direction of array (in the vertical direction in the present embodiment). A pair of the end plates 104 and 106 are disposed in such a manner as to hold an assembly of the seven electricity generation units 102 from the vertical direction. The direction of array (vertical direction) corresponds to the first direction appearing in CLAIMS.

The fuel cell stack 100 has a plurality (eight in the present embodiment) of holes formed therein and extending in the vertical direction through peripheral portions about the Z-axis direction of its component layers (the electricity generation units 102 and the end plates 104 and 106), and the corresponding holes formed in the layers communicated with one another in the vertical direction, thereby forming communication holes 108 extending in the vertical direction from one end plate 104 to the other end plate 106. In the following description, individual holes which constitute each communication hole 108 and are formed in the individual layers of the fuel cell stack 100 will be called the "communication holes 108."

Bolts 22 extending in the vertical direction are inserted into the corresponding communication holes 108, and the fuel cell stack 100 is clamped by means of the bolts 22 and nuts 24 engaged with opposite ends of the bolts 22. AS shown in FIGS. 2 and 3, corresponding insulation sheets 26 intervene between the nuts 24 engaged with one ends (upper ends) of the bolts 22 and the upper surface of the end plate 104 serving as the upper end of the fuel cell stack 100 and between the nuts 24 engaged with the other ends (lower ends) of the bolts 22 and the lower surface of the end plate 106 serving as the lower end of the fuel cell stack 100. However, in each region where a gas passage member 27, which will be described later, is provided, the gas passage member 27 and the insulation sheets 26 disposed respectively on the upper end and on the lower end of the gas passage member 27 intervene between the nut 24 and the surface of the end plate 106. The insulation sheet 26 is formed of, for example, a mica sheet, a ceramic fiber sheet, a ceramic compact sheet, a glass sheet, or a glass ceramic composite material.

The outside diameter of a shaft portion of each bolt 22 is smaller than the inside diameter of each communication hole 108. Accordingly, a space exists between the outer circumferential surface of the shaft portion of each bolt 22 and the inner circumferential surface of each communication hole 108. As shown in FIGS. 1 and 2, a space defined by the bolt 22 (bolt 22A) located at around the midpoint of one side of the perimeter about the Z-axis direction of the fuel cell stack 100 (a side at the positive side in the X-axis direction of two sides in parallel with the Y-axis) and the communication hole 108 into which the bolt 22A is inserted functions as an oxidizer gas introduction manifold 161 into which oxidizer gas OG is introduced from outside the fuel cell stack 100 and which serves as a gas flow channel for supplying the oxidizer gas OG to the electricity generation units 102, whereas a space defined by the bolt 22 (bolt 22B) located at around the midpoint of the other side opposite the above side (a side at the negative side in the X-axis direction of two sides in parallel with the Y-axis) and the communication hole 108 into which the bolt 22B is inserted functions as an oxidizer gas discharge manifold 162 from which oxidizer offgas OOG discharged from the cathode chambers 166 of the electricity generation units 102 is discharged to the outside of the fuel cell stack 100. In the present embodiment, for example, air is used as the oxidizer gas OG. The oxidizer gas introduction manifold 161 and the oxidizer gas discharge manifold 162 correspond to the oxidizer gas flow channel appearing in CLAIMS. Hereinafter, the oxidizer gas introduction manifold 161 and the oxidizer gas discharge manifold 162 may be collectively referred to as the "oxidizer gas flow channel." The communication hole 108 formed in the interconnectors 150 and defining the oxidizer gas introduction manifold 161 or the oxidizer gas discharge manifold 162 corresponds to the second through hole (hereinafter may be referred to as the "cathode chamber communication hole 108A") appearing in CLAIMS.

As shown in FIGS. 1 and 3, a space defined by the bolt 22 (bolt 22D) located at around the midpoint of one side of the perimeter about the Z-axis direction of the fuel cell stack 100 (a side at the positive side in the Y-axis direction of two sides in parallel with the X-axis) and the communication hole 108 into which the bolt 22D is inserted functions as a fuel gas introduction manifold 171 into which fuel gas FG is introduced from outside the fuel cell stack 100 and which supplies the fuel gas FG to the electricity generation units 102, whereas a space defined by the bolt 22 (bolt 22E) located at around the midpoint of the other side opposite the above side (a side at the negative side in the Y-axis direction of two sides in parallel with the X-axis) and the communication hole 108 into which the bolt 22E is inserted functions as a fuel gas discharge manifold 172 from which fuel offgas FOG discharged from the anode chambers 176 of the electricity generation units 102 is discharged to the outside of the fuel cell stack 100. In the present embodiment, for example, hydrogen-rich gas reformed from city gas is used as the fuel gas FG. The fuel gas introduction manifold 171 and the fuel gas discharge manifold 172 correspond to the fuel gas flow channel appearing in CLAIMS. Hereinafter, the fuel gas introduction manifold 171 and the fuel gas discharge manifold 172 may be collectively referred to as the "fuel gas flow channel." The communication hole 108 formed in the interconnectors 150 and defining the fuel gas introduction manifold 171 or the fuel gas discharge manifold 172 corresponds to the first through hole (hereinafter may be referred to as the "anode chamber communication hole 108B") appearing in CLAIMS.

The fuel cell stack 100 has four gas passage members 27. Each gas passage member 27 has a tubular body portion 28 and a tubular branch portion 29 branching from the side surface of the body portion 28. The hole of the branch portion 29 communicates with the hole of the body portion 28. A gas pipe (not shown) is connected to the branch portion 29 of each gas passage member 27. As shown in FIG. 2, the hole of the body portion 28 of the gas passage member 27 disposed at the position of the bolt 22A which partially defines the oxidizer gas introduction manifold 161 communicates with the oxidizer gas introduction manifold 161, whereas the hole of the body portion 28 of the gas passage member 27 disposed at the position of the bolt 22B which partially defines the oxidizer gas discharge manifold 162 communicates with the oxidizer gas discharge manifold 162. Also, as shown in FIG. 3, the hole of the body portion 28 of the gas passage member 27 disposed at the position of the bolt 22D which partially defines the fuel gas introduction manifold 171 communicates with the fuel gas introduction manifold 171, whereas the hole of the body portion 28 of the gas passage member 27 disposed at the position of the bolt 22E which partially defines the fuel gas discharge manifold 172 communicates with the fuel gas discharge manifold 172.

(Structure of End Plates 104 and 106)

The two end plates 104 and 106 are electrically conductive members each having an approximately rectangular flat-plate shape and are formed of, for example, stainless steel. One end plate 104 is disposed on the uppermost electricity generation unit 102, and the other end plate 106 is disposed under the lowermost electricity generation unit 102. A plurality of the electricity generation units 102 are held under pressure between the two end plates 104 and 106. The upper end plate 104 functions as a positive output terminal of the fuel cell stack 100, and the lower end plate 106 functions as a negative output terminal of the fuel cell stack 100.

(Structure of Electricity Generation Unit 102)

Figure 4:
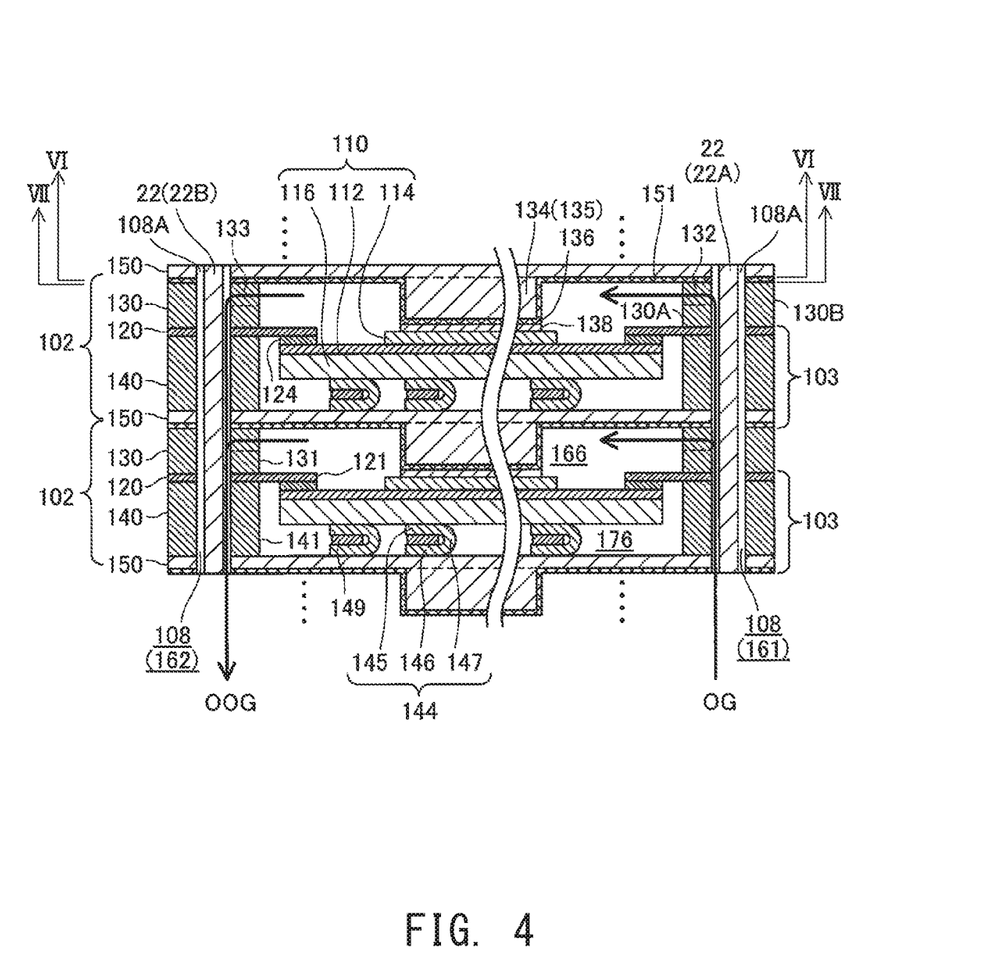
FIG. 4 Explanatory view of the same XZ section as that of FIG. 2, showing two adjacent electricity generation units 102.
Figure 5:
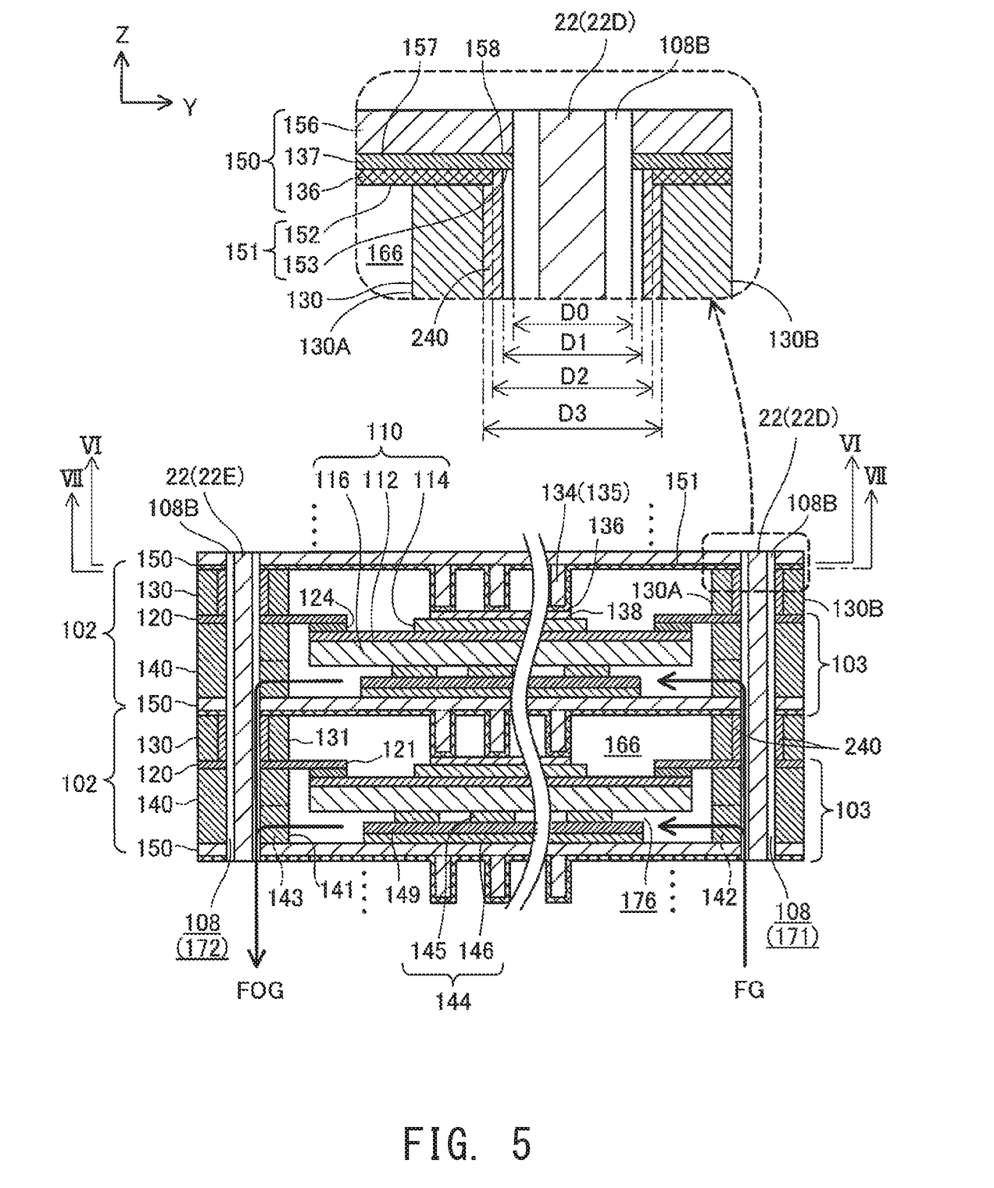
FIG. 5 Explanatory view of the same YZ section as that of FIG. 3, showing two adjacent electricity generation units 102.
Figure 6:
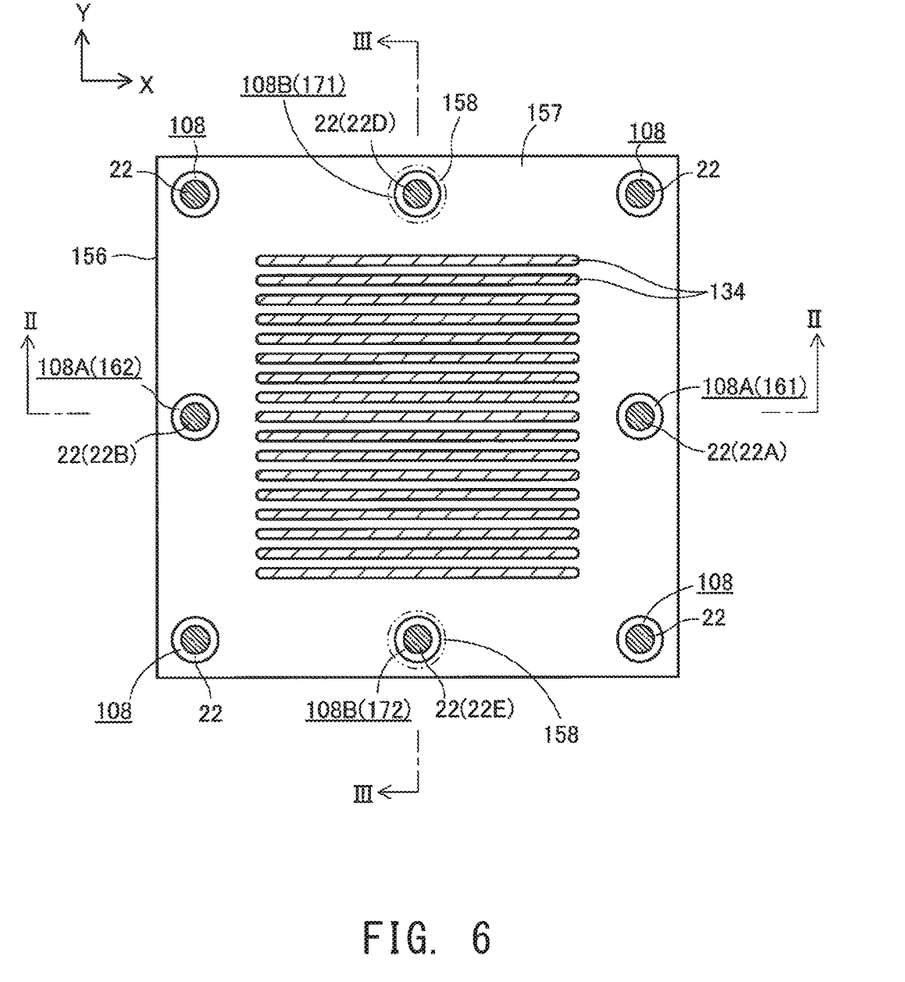
FIG. 6 Explanatory view showing an XY section of an interconnector 150 (the surface of a substrate 156 on the side toward a cathode 114) taken along line VI-VI of FIG. 4.
Figure 7:
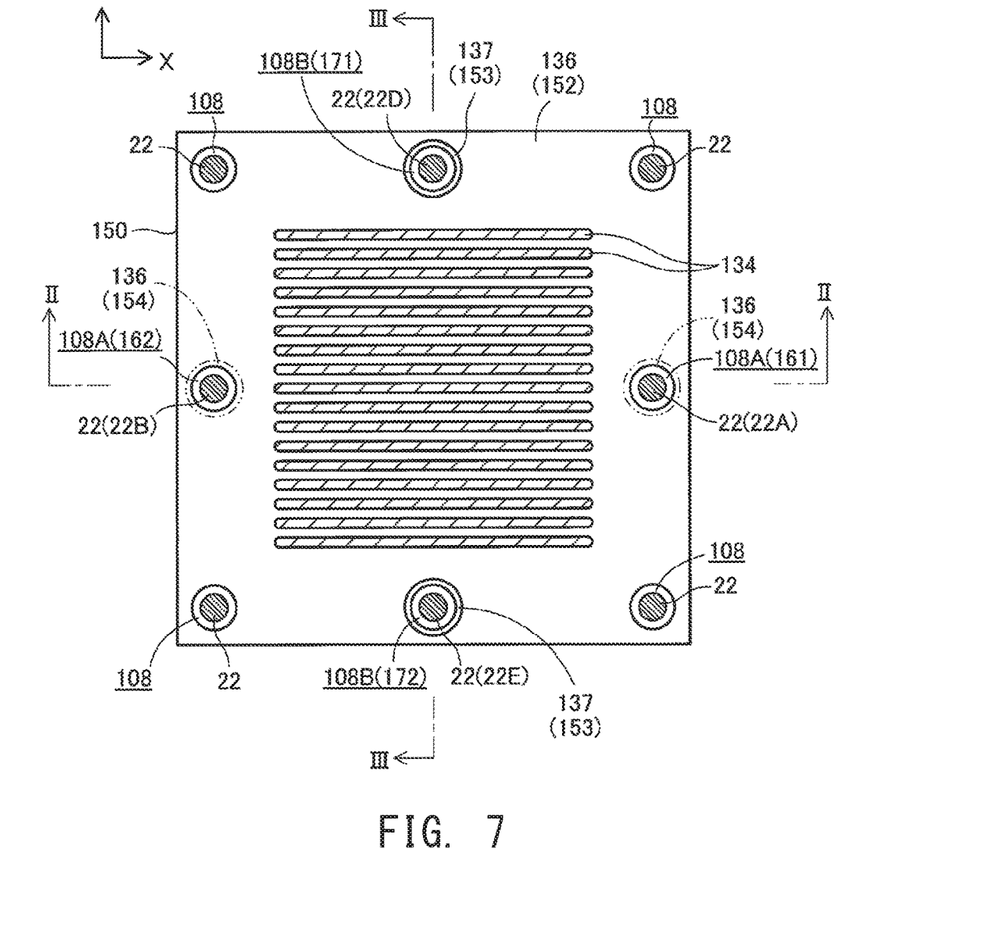
FIG. 7 Explanatory view showing an XY section of the interconnector 150 taken along line VII-VII of FIG. 4.

FIG. 4 is an explanatory view of the same XZ section as that of FIG. 2, showing two adjacent electricity generation units 102, and FIG. 5 is an explanatory view of the same YZ section as that of FIG. 3, showing two adjacent electricity generation units 102. FIG. 6 is an explanatory view showing an XY section of the interconnector 150 (the surface of a substrate 156 on the side toward the cathode 114) taken along line VI-VI of FIG. 4, and FIG. 7 is an explanatory view showing an XY section of the interconnector 150 taken along line VII-VII of FIG. 4.

As shown in FIGS. 4 and 5, the electricity generation unit 102 serving as the smallest unit of electricity generation includes a unit cell 110, a separator 120, a cathode-side frame 130, a cathode-side current collector 134, an anode-side frame 140, an anode-side current collector 144, and a pair of interconnectors 150 serving as the uppermost layer and the lowermost layer of the electricity generation unit 102. Holes corresponding to the communication holes 108 into which the bolts 22 are inserted are formed in peripheral portions about the Z-axis direction of the separator 120, the cathode-side frame 130, the anode-side frame 140, and the interconnectors 150. The unit cell 110 corresponds to the fuel cell unit cell or electrochemical reaction unit cell appearing in CLAIMS.

The interconnector 150 includes a substrate 156 which is an electrically conductive member having an approximately rectangular flat plate shape and is formed of a Cr (chromium)-containing metal (e.g., ferritic stainless steel), and coatings (136, 137) which are disposed on the surface of the substrate 156 on the side toward the cathode 114 so as to form a first surface 151 (on the side toward the cathode 114) of the interconnector 150. The interconnector 150 secures electrical conductivity between the electricity generation units 102 and prevents mixing of reaction gases between the electricity generation units 102. In the present embodiment, two electricity generation units 102 are disposed adjacent to each other, and the two adjacent electricity generation units 102 share one interconnector 150. That is, the upper interconnector 150 of a certain electricity generation unit 102 serves as a lower interconnector 150 of the upper adjacent electricity generation unit 102. Also, since the fuel cell stack 100 has the two end plates 104 and 106, the uppermost electricity generation unit 102 of the fuel cell stack 100 does not have the upper interconnector 150, and the lowermost electricity generation unit 102 does not have the lower interconnector 150 (see FIGS. 2 and 3).

The unit cell 110 includes an electrolyte layer 112, and a cathode 114 and an anode 116 which face each other in the vertical direction (direction of array of the electricity generation units 102) with the electrolyte layer 112 intervening therebetween. The unit cell 110 of the present embodiment is an anode-support-type unit cell in which the anode 116 supports the electrolyte layer 112 and the cathode 114.

The electrolyte layer 112 is a member having an approximately rectangular flat-plate shape and is formed of a solid oxide; for example, YSZ (yttria-stabilized zirconia), ScSZ (scandia-stabilized zirconia), SDC (samarium-doped cerin), GDC (gadolinium-doped ceria), or a perovskite-type oxide. The cathode 114 is a member having an approximately rectangular flat-plate shape and is formed of, for example, a perovskite-type oxide (e.g., LSCF (lanthanum strontium cobalt ferrite), ISM (lanthanum strontium manganese oxide), or LNF (lanthanum nickel ferrite)). The anode 116 is a member having an approximately rectangular flat-plate shape and is formed of, for example, Ni (nickel), a cermet of Ni and ceramic powder, or an Ni-based alloy. Thus, the unit cell 110 (electricity generation unit 102) of the present embodiment is a solid oxide fuel cell (SOFC) which uses a solid oxide as an electrolyte.

The separator 120 is a frame member which has an approximately rectangular hole 121 formed in a central region thereof and extending therethrough in the vertical direction, and is formed of, for example, a metal. A portion of the separator 120 around the hole 121 faces a peripheral portion of the surface on the cathode 114 side of the electrolyte layer 112. The separator 120 is bonded to the electrolyte layer 112 (unit cell 110) by means of a bonding member 124 formed of a brazing material (e.g., Ag brazing material) and disposed between the facing portion and the electrolyte layer 112. The separator 120 separates the cathode chamber 166 which faces the cathode 114, and the anode chamber 176 which faces the anode 116, from each other, thereby preventing gas leakage from one electrode side to the other electrode side through a peripheral portion of the unit cell 110. The unit cell 110 to which the separator 120 is bonded is also called a "separator-attached unit cell."

The cathode-side frame 130 is a frame member which has an approximately rectangular hole 131 formed in a central region thereof and extending therethrough in the vertical direction, and is formed of, for example, an insulator such as mica. The hole 131 of the cathode-side frame 130 partially constitutes the cathode chamber 166 which faces the cathode 114. The cathode-side frame 130 is in contact with a peripheral portion of the surface on a side opposite the electrolyte layer 112 of the separator 120 and with a peripheral portion of the surface on a side toward the cathode 114 of the interconnector 150. The cathode-side frame 130 electrically insulates the two interconnectors 150 contained in the electricity generation unit 102 from each other. Also, the cathode-side frame 130 has an oxidizer gas supply communication hole 132 formed therein and adapted to establish communication between the oxidizer gas introduction manifold 161 and the cathode chamber 166, and an oxidizer gas discharge communication hole 133 formed therein and adapted to establish communication between the cathode chamber 166 and the oxidizer gas discharge manifold 162. Hereinafter, the wall defining the hole 131 of the cathode-side frame 130 may be referred to as the "inner peripheral wall 130A," and the wall corresponding to the outer periphery of the cathode-side frame 130 may be referred to as the "outer peripheral wall 130B."

The anode-side frame 140 is a frame member which has an approximately rectangular hole 141 formed in a central region thereof and extending therethrough in the vertical direction, and is formed of, for example, a metal. The hole 141 of the anode-side frame 140 partially constitutes the anode chamber 176 which faces the anode 116. The anode-side frame 140 is in contact with a peripheral portion of the surface on a side toward the electrolyte layer 112 of the separator 120 and with a peripheral portion of the surface on a side toward the anode 116 of the interconnector 150. Also, the anode-side frame 140 has a fuel gas supply communication hole 142 formed therein and adapted to establish communication between the fuel gas introduction manifold 171 and the anode chamber 176, and a fuel gas discharge communication hole 143 formed therein and adapted to establish communication between the anode chamber 176 and the fuel gas discharge manifold 172.

The anode-side current collector 144 is disposed within the anode chamber 176. The anode-side current collector 144 includes an interconnector facing portion 146, an electrode facing portion 145, and a connection portion 147 which connects the electrode facing portion 145 and the interconnector facing portion 146 to each other, and is formed of, for example, nickel, a nickel alloy, or stainless steel. The electrode facing portion 145 is in contact with the surface on a side opposite the electrolyte layer 112 of the anode 116, and the interconnector facing portion 146 is in contact with the surface on a side toward the anode 116 of the interconnector 150. However, as described above, since the electricity generation unit 102 disposed at the lowermost position in the fuel cell stack 100 does not have the lower interconnector 150, the interconnector facing portion 146 in the lowermost electricity generation unit 102 is in contact with the lower end plate 106. Since the anode-side current collector 144 is thus configured, the anode-side current collector 144 electrically connects the anode 116 and the interconnector 150 (or the end plate 106) to each other spacer 149 formed of, for example, mica is disposed between the electrode facing portion 145 and the interconnector facing portion 146. As a result, the anode-side current collector 144 follows the deformation of the electricity generation unit 102 stemming from a temperature cycle and a pressure variation of reaction gas, thereby maintaining good electrical connection through the anode-side current collector 144 between the anode 116 and the interconnector 150 (or the end plate 106).

The cathode-side current collector 134 is disposed within the cathode chamber 166. The cathode-side current collector 134 is composed of a plurality of current collector elements 135 each having an approximately rectangular columnar shape and is formed of, for example, a metal which contains Cr (chromium), such as ferritic stainless steel. The cathode-side current collector 134 is in contact with the surface on a side opposite the electrolyte layer 112 of the cathode 114 and with the surface on a side toward the cathode 114 of the interconnector 150. However, as described above, since the electricity generation unit 102 disposed at the uppermost position in the fuel cell stack 100 does not have the upper interconnector 150, the cathode-side current collector 134 in the uppermost electricity generation unit 102 is in contact with the upper end plate 104. Since the cathode-side current collector 134 is thus configured, the cathode-side current collector 134 electrically connects the cathode 114 and the interconnector 150 (or the end plate 104) to each other. In the present embodiment, the cathode-side current collector 134 and the interconnector 150 are integrally formed as a unitary member. That is, a flat-plate-shape portion orthogonal to the vertical direction (t-axis direction) of the unitary member functions as the interconnector 150, and a plurality of the current collector elements 135 protruding from the flat-plate-shape portion toward the cathode 114 collectively function as the cathode-side current collector 134.

As shown in FIGS. 4 and 5, the surface of the cathode-side current collector 134 is covered with an electrically conductive first coating 136. The first coating 136 is formed of, for example, a spinel oxide (e.g., $Mn_{1.5}Co_{1.5}O_4$, $MnCo_2O_4$, $ZnMnCoO_4$, $CuMn_2O_4$, $MnFe_2O_4$, $ZnMn_2O_4$, $Cu_{1.4}Mn_{1.6}O_4$, or $CoFe_2O_4$). As described above, in the present embodiment, since the cathode-side current collector 134 and the interconnector 150 are integrally formed as a unitary member, in actuality, a surface of the cathode-side current collector 134 serving as a boundary surface between the cathode-side current collector 134 and the interconnector 150 is not covered with the first coating 136. The coatings (136, 137) forming the first surface 151 of the interconnector 150 will be described below.

The cathode 114 and the cathode-side current collector 134 are bonded together by an electrically conductive bonding layer 138. The bonding layer 138 is formed of, for example, a spinel oxide (e.g., $Mn_{1.5}CO_{1.5}O_4$, $MnCo_2O_4$, $ZnCo_2O_4$, $ZnMn_2O_4$, $ZnMnCoO_4$, or $CuMn_2O_4$). The bonding layer 138 is formed, for example, as follows: bonding-layer paste is applied, by printing, to portions of the surface of the cathode 114 which face respective end portions of the current collector elements 135 which constitute the cathode-side current collector 134; then, in a state in which the end portions of the current collector elements 135 are pressed against the paste, firing is performed under predetermined conditions. The bonding layer 138 electrically connects the cathode 114 and the cathode-side current collector 134. In the previous description, the cathode-side current collector 134 is said to be in contact with the surface of the cathode 114; however, strictly speaking, the bonding layer 138 intervenes between the cathode 114 and the cathode-side current collector 134 (covered with the first coating 136). In the present embodiment, the first coating 136 and the bonding layer 138 are formed of respective spinel oxides which contain the same main component elements. The main component elements mean metal elements used to form a spinel oxide. A spinel oxide is identified by performing X-ray diffraction and ultimate analysis.

A-2. Operation of Fuel Cell Stack 100:

As shown in FIGS. 2 and 4, when the oxidizer gas OG is supplied through a gas pipe (not shown) connected to the branch portion 29 of the gas passage member 27 provided at the position of the oxidizer gas introduction manifold 161, the oxidizer gas OG is supplied to the oxidizer gas introduction manifold 161 through the holes of the branch portion 29 and the body portion 28 of the gas passage member 27 and is then supplied from the oxidizer gas introduction manifold 161 to the cathode chambers 166 through the oxidizer gas supply communication holes 132 of the electricty generation units 102. Also, as shown in FIGS. 3 and 5, when the fuel gas FG is supplied through a gas pipe (not shown) connected to the branch portion 29 of the gas passage member 27 provided at the position of the fuel gas introduction manifold 171, the fuel gas FG is supplied to the fuel gas introduction manifold 171 through the holes of the branch portion 29 and the body portion 28 of the gas passage member 27 and is then supplied from the fuel gas introduction manifold 171 to the anode chambers 176 through the fuel gas supply communication holes 142 of the electricity generation units 102.

When the oxidizer gas OG is supplied to the cathode chamber 166 of each electricity generation unit 102, whereas the fuel gas FG is supplied to the anode chamber 176 of each electricity generation unit 102, the unit cell 110 generates electricity through the electrochemical reaction between the oxidizer gas OG and the fuel gas PG. The electricity generating reaction is an exothermic reaction. In each electricity generation unit 102, the cathode 114 of the unit cell 110 is electrically connected to one interconnector 150 through the cathode-side current collector 134 (and the first coating 136 and the bonding layer 138), whereas the anode 116 is electrically connected to the other interconnector 150 through the anode-side current collector 144. Also, a plurality of the electricity generation units 102 contained in the fuel cell stack 100 are connected electrically in series. Accordingly, electric energy generated in the electricity generation units 102 is output from the end plates 104 and 106 which function as output terminals of the fuel cell stack 100. Notably, in the SCFC, since electricity is generated at a relatively high temperature (e.g., 700° C. to 1,000° C.), the fuel cell stack 100 may be heated by a heater (not shown) from startup until the high temperature can be maintained by means of heat generated as a result of generation of electricity.

As shown in FIGS. 2 and 4, the oxidizer offgas OOG discharged from the cathode chambers 166 of the electricity generation units 102 is discharged to the oxidizer gas discharge manifold 162 through the oxidizer gas discharge communication holes 133, passes through the holes of the body portion 28 and the branch portion 29 of the gas passage member 27 provided at the position of the oxidizer gas discharge manifold 162, and is then discharged to the outside of the fuel cell stack 100 through a gas pipe (not shown) connected to the branch portion 29. Also, as shown in FIGS. 3 and 5, the fuel offgas FOG discharged from the anode chambers 176 of the electricity generation units 102 is discharged to the fuel gas discharge manifold 172 through the fuel gas discharge communication holes 143, passes through the holes of the body portion 28 and the branch portion 29 of the gas passage member 27 provided at the position of the fuel gas discharge manifold 172, and is then discharged to the outside of the fuel cell stack 100 through a gas pipe (not shown) connected to the branch portion 29.

A-3. Gas Sealing in Fuel Cell Stack 100:

The leakage of the fuel gas FG (or the fuel offgas FOG) from the fuel gas flow channel to the cathode chamber 166 in the fuel cell stack 100 leads to an undesirable reduction in performance of the fuel cell stack 100. Thus, high gas sealing performance is required for the fuel cell stack 100. Now will be described the gas sealing in the fuel cell stack 100.

The cathode-side frame 130 included in each electricity generation unit 102 of the fuel cell stack 100 functions as a so-called compression sealing. Specifically, the cathode-side frame 130 is sandwiched and compressed between the separator 120 and the interconnector 150 and thus is in close contact with the surfaces of the separator 120 and the interconnector 150. Therefore, the cathode-side frame 130 prevents leakage of the oxidizer gas OG (or the oxidizer offgas OOG) from the cathode chamber 166, the oxidizer gas introduction manifold 161, or the oxidizer gas discharge manifold 162 through the interface between the cathode-side frame 130 and the separator 120 or the interface between the cathode-side frame 130 and the interconnector 150 (FIG. 4).

As shown in FIG. 5, an annular glass sealing 240 is disposed so as to surround each of the fuel gas introduction manifold 171 and the fuel gas discharge manifold 172 between the separator 120 and the interconnector 150, which faces the separator 120 with the cathode-side frame 130 intervening therebetween. The glass sealing 240 prevents leakage of the fuel gas FG (or the fuel offgas FOG) from the fuel gas flow channel through the interface between the cathode-side frame 130 and the separator 120 or the interface between the cathode-side frame 130 and the interconnector 150. As illustrated in the enlarged view (FIG. 5), in the present embodiment, the inner diameter D1 of the glass sealing 240 is greater than the inner diameter D0 of the communication hole 108 (anode chamber communication hole 108B). Specifically, the glass sealing 240 is disposed outward of a weld portion (not illustrated) that bonds the separator 120 and the peripheral portion of the hole 141 of the anode-side frame 140. The glass sealing 240, which is an insulator, does not inhibit the electrical insulation between the paired interconnectors 150 included in each electricity generation unit 102. In the present embodiment, the glass sealing 240 is not provided around the oxidizer gas introduction manifold 161 or the oxidizer gas discharge manifold 162. The unit cell 110, the separator 120, the anode-side frame 140, the interconnector 150 located on the anode 116 side of the unit cell 110, the anode-side current collector 144, and the spacer 149 form the interconnector-electrochemical reaction unit cell composite body (hereinafter may be referred to simply as the "composite body 103") appearing in CLAIMS (see FIGS. 4 and 5). The cathode-side frame 130 and the glass sealing 240 disposed between two composite bodies 103 correspond to the sealing member appearing in CLAIMS.

In the fuel cell stack 100, the gas sealing between the anode-side frame 140 and the adjacent separator 120 or interconnector 150 included in each electricity generation unit 102 is secured by means of welding. For example, the separator 120 is bonded to a portion of the anode-side frame 140 around the hole 141 by means of laser welding.

A-4. Coating of First Surface 151 of Interconnector 150:

In the surface of the substrate 156 on the side toward the cathode 114, two annular regions surrounding the entire perimeters of the anode chamber communication holes 108B (see FIG. 6) will hereinafter be referred to as the "second substrate regions 158," and the region excluding the two second substrate regions 158 (see FIG. 6) will hereinafter be referred to as the "first substrate region 157." The first substrate region 157 is adjacent to the second substrate regions 158. In the first surface 151 of the interconnector 150, two annular surface regions surrounding the entire perimeters of the anode chamber communication holes 108B (see FIG. 7) will hereinafter be referred to as the "second surface regions 153," and the region excluding the two second surface regions 153 (see FIGS. 4, 5, and 7) will hereinafter be referred to as the "first surface region 152." The first surface region 152 is adjacent to the second surface regions 153. In the present embodiment, the outer diameter D2 of each second surface region 153 (the diameter of the boundary between the first surface region 152 and the second surface region 153) is greater than the inner diameter D1 of the glass sealing 240 and smaller than the outer diameter D3 of the glass sealing 240.

The first substrate region 157 of the substrate 156 is covered with the second coating 137, and the entire surface of a portion of the second coating 137, which portion covers the first substrate region 157, is covered with the aforementioned first coating 136. Each of the second substrate regions 158 of the substrate 156 is covered with the second coating 137. The surface of a portion of the second coating 137, which portion covers the second substrate region 158, is not covered with the first coating 136 and is in contact with the glass sealing 240. Thus, the first surface region 152 of the interconnector 150 is formed of the first coating 136, and the second surface region 153 is formed of the second coating 137. The surface regions 154 surrounding the entire perimeters of the cathode chamber communication holes 108A of the interconnector 150 (see FIG. 7) are also formed of the first coating 136. The second coating 137 is formed of chromium oxide coating (chromia coating), and exhibits high reduction resistance to the fuel gas FG as compared with the first coating 136.

In the aforementioned configuration, the first coating 136 faces the cathode chamber 166, the oxidizer gas introduction manifold 161, and the oxidizer gas discharge manifold 162 through which the oxidizer gas OG flows, but the second coating 137 is not exposed to the cathode chamber 166, the oxidizer gas introduction manifold 161, and the oxidizer gas discharge manifold 162. The second coating 137 faces the fuel gas flow channel through which the fuel gas FG flows, but the first coating 136 is not exposed to the fuel gas flow channel. The first coating 136, which covers the cathode-side current collector 134, is preferably formed of a material exhibiting electrical conductivity higher than that of the material used for the second coating 137. The first coating 136, which faces the cathode chamber 166, is preferably formed of a material exhibiting high oxidation resistance to the oxidizer gas OG as compared with the material used for the second coating 137. In the present embodiment, the substrate 156 of the interconnector 150 is formed of a Cr-containing metal. Thus, in order to prevent "Cr diffusion" from the surface of the substrate 156, the first coating 136 is preferably formed of a material exhibiting a high effect of reducing Cr diffusion as compared with the material used for the second coating 137.

Next will be described a process for forming a coating on the first surface 151 of the interconnector 150. Firstly, the interconnector 150 is subjected to thermal treatment, to thereby cause Cr precipitation from the substrate 156 of the interconnector 150. The second coating 137 (chromia coating) is thereby formed on the surface of the substrate 156 on the side toward the cathode 114. The thickness of the second coating 137 can be controlled by varying the firing temperature or the firing time during the thermal treatment. Subsequently, the first coating 136 is formed by a well-known technique (e.g., spray coating, inkjet printing, spin coating, dip coating, plating, sputtering, or thermal spraying) while masking regions (corresponding to the second surface regions 153) of the surface of the second coating 137 formed on the surface of the substrate 156 on the side toward the cathode 114. Thereafter, the mask is removed from the second surface regions 153. This process can produce the interconnector 150 including the first surface region 152 formed of the first coating 136 and the second surface regions 153 formed of the second coating 137. In an alternative coating process, the first coating 136 may be entirely formed on the unmasked surface of the second coating 137 formed on the surface of the substrate 156 on the side toward the cathode 114, followed by removal of portions of the first coating 136 corresponding to the second surface regions 153.

Figure 8:
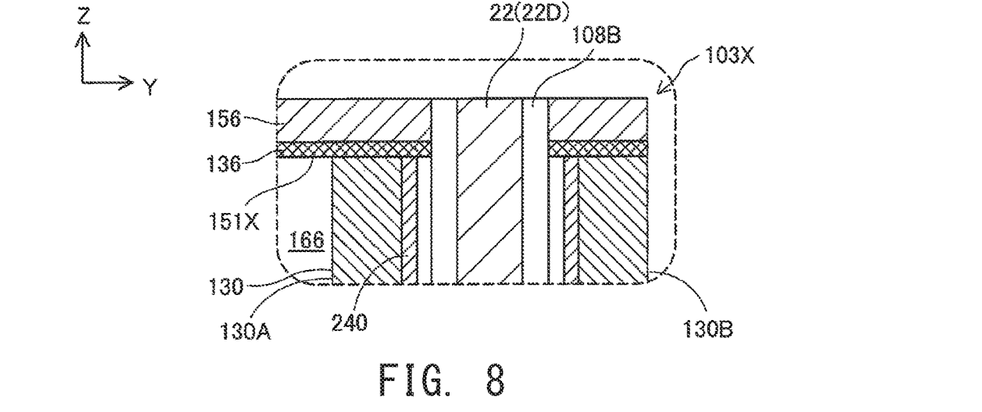
FIG. 8 Explanatory view showing a changing state 1 of a region between an interconnector 150 and a glass sealing 240, etc. in a comparative composite body 103X.
Figure 9:
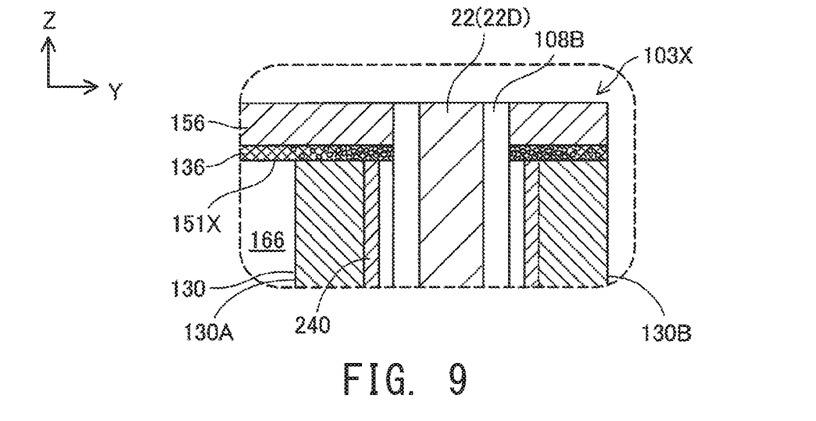
FIG. 9 Explanatory view showing a changing state 2 of the region between the interconnector 150 and the glass sealing 240, etc. in the comparative composite body 103X.
Figure 10:
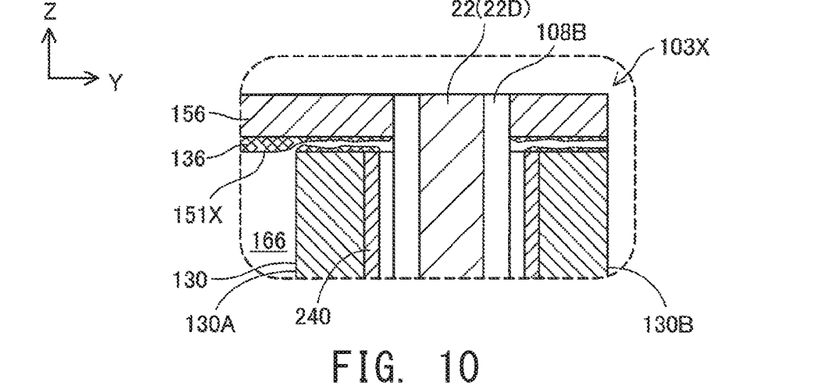
FIG. 10 Explanatory view showing a changing state 3 of the region between the interconnector 150 and the glass sealing 240, etc. in the comparative composite body 103X.

A-5. Leakage of Fuel Gas FG from Fuel Gas Flow Channel to Cathode Chamber 166:

FIGS. 8 to 10 are explanatory views showing changing states 1 to 3 of a region between an interconnector 150 and a cathode-side frame 130 and a glass sealing 240 in a comparative composite body 103X. As shown in FIG. 8, the entirety of a first surface 151X of the comparative composite body 103X is formed only of the first coating 136. Thus, in the comparative composite body 103X, the first coating 136 is exposed to a fuel gas flow channel. When a fuel cell stack 100A including the comparative composite body 103X is operated, the first coating 136 may become porous due to the reduction reaction between the first coating 136 and a fuel gas FG flowing through the fuel gas flow channel (see FIG. 9), and a through hole may be formed between the fuel gas flow channel and the cathode chamber 166, resulting in formation of a leakage path of the fuel gas FG (see FIG. 10).

A-6. Method of Evaluating Reduction Resistance of First Coating 136 and Second Coating 137:

As described above, the second coating 137 exhibits reduction resistance to the fuel gas FG higher than that of the first coating 136. The reduction resistances of the first coating 136 and the second coating 137 are evaluated by a method described below. Firstly, there are provided a fuel cell stack 100 including one composite body 103 of the present embodiment and a fuel cell stack 100A including one comparative composite body 103X. As described above, in the composite body 103 of the present embodiment, the second coating 137 is exposed to the fuel gas flow channel, but the first coating 136 is not exposed thereto. In the comparative fuel cell stack 100A, the first coating 136 is exposed to the fuel gas flow channel.

The fuel cell stack 100 and the fuel cell stack 100A are operated at 850° C. (thermally treated) for a predetermined period of time, and then the leakage of the fuel gas PG between the cathode chamber 166 and the fuel gas flow channel is tested in a fuel gas FG atmosphere (flow rate: 3 L/min, pressure: 10 kpa). A fuel cell stack in which a leakage of the fuel gas FG of 10 mL or more is detected first is evaluated as having lower reduction resistance. Since the chromia coating forming the second coating 137 exhibits reduction resistance higher than that of the aforementioned material used for formation of the first coating 136, a leakage of the fuel gas FG of 10 ml or more is detected in the fuel cell stack 100A before being detected in the fuel cell stack 100. The aforementioned predetermined period of time corresponds to the period between the initiation of the operation and occurrence of a difference in leakage of the fuel gas FG between the fuel cell stack 100 and the fuel cell stack 100A. The period is not necessarily constant and may vary with, for example, the operation temperature or the combination of the materials used for formation of the first coating 136 and the second coating 137. The oxidation resistance of the first coating 136 or the second coating 137 is evaluated in the same manner as in the aforementioned evaluation of reduction resistance (under the same conditions in terms of gas flow rate, pressure, and time), except that the leakage of the oxidizer gas OG (air) between the cathode chamber 166 and the fuel gas flow channel is tested in an oxidizer gas FG (air) atmosphere.

A-7. Advantageous Effects of the Present Embodiment:

According to the composite body 103 of the present embodiment, the second coating 137, which exhibits reduction resistance higher than that of the first coating 136, is disposed over the entire periphery of each anode chamber communication hole 108B to be located between the fuel gas flow channel and the first coating 136 forming the first surface region 152 of the interconnector 150. This configuration can prevent impairment of the sealing performance of the fuel gas flow channel, which would otherwise occur due to reduction reaction between the first coating 136 and the fuel gas FG.

The surface region 154 surrounding the entire periphery of each cathode chamber communication hole 108A (see FIG. 7) is formed of the first coating 136. Thus, even in the case where the second coating 137 is formed of a material exhibiting low oxidation resistance as compared with the material used for the first coating 136, the oxidation reaction can be prevented in the oxidizer gas flow channel since the second coating 137 is not exposed to the oxidizer gas flow channel.

The outer diameter D2 of each second surface region 153 is smaller than the outer diameter D3 of the glass sealing 240. In other words, the entire outer peripheral contour of the second coating 137 is located inward of the outer peripheral contour of the glass sealing 240. Thus, even in the case where the second coating 137 is formed of a material exhibiting low oxidation resistance or low effect of reducing Cr diffusion as compared with the material used for the first coating 136, the oxidation reaction or Cr diffusion can be prevented in the cathode chamber 166 since the second coating 137 is not exposed to the cathode chamber 166.

The outer diameter D2 of each second surface region 153 is greater than the inner diameter D1 of the glass sealing 240. In other words, the entire outer peripheral contour of the second coating 137 is located outward of the inner peripheral contour of the glass sealing 240. Thus, in the first surface 151 of the interconnector 150, the region forming the fuel gas flow channel is formed of the second coating 137. This configuration avoids exposure of the first coating 136 to the fuel gas flow channel, and thus more reliably prevents impairment of the sealing performance of the fuel gas flow channel, which would otherwise occur due to reduction reaction between the first coating 136 and the fuel gas FG.

The inner diameter D2 of the first surface region 152 (the outer diameter D2 of the second surface region 153) is greater than the inner diameter D1 of the glass sealing 240. In other words, the entire inner peripheral contour of the first coating 136 is located outward of the inner peripheral contour of the glass sealing 240 and is provided between the interconnector 150 and the sealing member. Thus, separation of the end portion of the first coating 136 can be reduced as compared with the case where the first coating 136 is exposed to the inside of the glass sealing 240.

B. Second Embodiment

Figure 11:
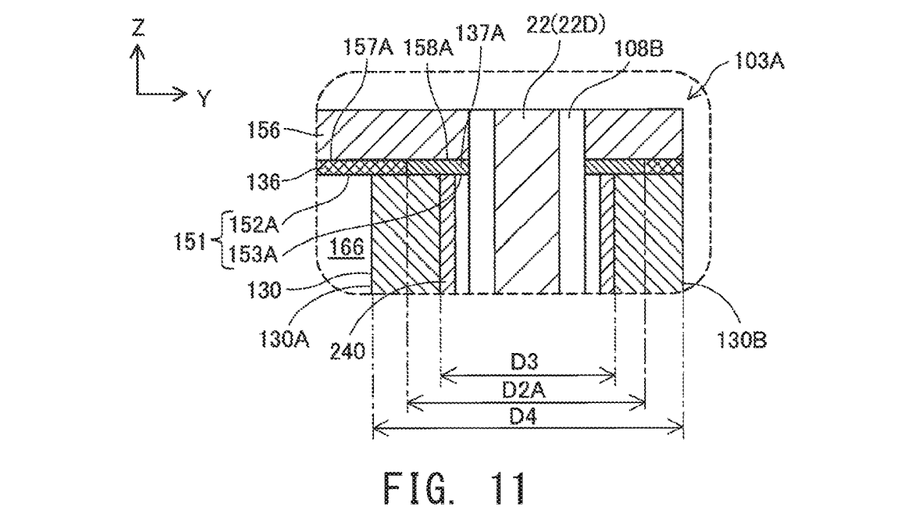
FIG. 11 Explanatory view showing an YZ section of a composite body 103A according to a second embodiment.

FIG. 11 is an explanatory view showing an XY section of a composite body 103A according to a second embodiment. The same components of the composite body 103A of the second embodiment as those in the composite body 103 of the first embodiment are denoted by the same reference numerals, and description thereof is omitted.

In the surface of the substrate 156 on the side toward the cathode 114, two annular regions surrounding the entire perimeters of the anode chamber communication holes 108B will hereinafter be referred to as the "second substrate regions 158A," and the region excluding the two second substrate regions 158A will hereinafter be referred to as the "first substrate region 157A." The first substrate region 157A is adjacent to the second substrate regions 158A. In the first surface 151 of the interconnector 150, two annular surface regions surrounding the entire perimeters of the anode chamber communication holes 108B will hereinafter be referred to as the "second surface regions 153A," and the region excluding the two second surface regions 153A will hereinafter be referred to as the "first surface region 152A." The first surface region 152A is adjacent to the second surface regions 153A. In the present embodiment, the outer diameter D2A of each second surface region 153A (the diameter of the boundary between the first surface region 152A and the second surface region 153A) is greater than the outer diameter D3 of the glass sealing 240 and smaller than the distance D4 between the inner peripheral wall 130A and the outer peripheral wall 130B of the cathode-side frame 130.

The first substrate region 157A of the substrate 156 is covered with the aforementioned first coating 136. Each of the second substrate regions 158A of the substrate 156 is covered with the second coating 137A, and the entire surface of the second coating 137A is in contact with the cathode-side frame 130 and the glass sealing 240. Thus, the first surface region 152A of the interconnector 150 is formed of the first coating 136, and the second surface region 153A is formed of the second coating 137A. The second coating 137A is formed of, for example, Ni (nickel) or an Ni alloy, and exhibits reduction resistance to the fuel gas FG higher than that of the first coating 136. The surface of the substrate 156 may be covered with a chromia coating in the same manner as in the first embodiment. Such a configuration can exhibit effects similar to those obtained in the first embodiment.

C. Modifications:

The technique disclosed in the present specification is not limited to the above embodiments, but may be modified into various other forms without departing from the gist thereof. For example, the technique may be modified as described below.

In the above embodiments, the sealing member is composed of the cathode-side frame 130 and the glass sealing 240. The sealing member is not necessarily limited thereto, and may be composed only of a glass sealing or a compression sealing formed of, for example, hermetically compressed mica. In the above embodiments, the inner diameter D1 of the glass sealing 240 may be equal to the inner diameter D0 of the communication hole 108 (anode chamber communication hole 108B).

In the above embodiments, the interconnector-electrochemical reaction unit cell composite body is the composite body 103 including the separator 120. The interconnector-electrochemical reaction unit cell composite body is not necessarily limited thereto, and may have a configuration including no separator 120. The interconnector-electrochemical reaction unit cell composite body may be of not only an anode support type, but also a cathode support type or an electrolyte support type.

In the first embodiment, the outer diameter D2 of each second surface region 153 may be greater than the outer diameter D3 of the glass sealing 240. In other words, the outer peripheral contour of the second coating 137 may be located outward of the outer peripheral contour of the glass sealing 240. In addition, the outer peripheral contour of the second coating 137 may be located outward of the inner peripheral wall 130A of the cathode-side frame 130. Even in such a case, the configuration of the first embodiment can prevent oxidation reaction or Cr diffusion in the cathode chamber 166. The inner diameter D2 of the first surface region 152 (the outer diameter D2 of the second surface region 153) may be smaller than the inner diameter D1 of the glass sealing 240. Even in such a case, the configuration of the first embodiment can more reliably prevent impairment of the sealing performance of the fuel gas flow channel and separation of the first coating 136.

In the above embodiments, the number of the electricity generation units 102 contained in the fuel cell stack 100 is a mere example and is determined as appropriate in accordance with, for example, a required output voltage of the fuel cell stack 100.

In the above embodiments, the nut 24 is engaged with each of opposite ends of the bolt 22. However, the bolt 22 may have a head, and the nut 24 may be engaged with only an end opposite the head of the bolt 22.

In the above embodiments, the endplates 104 and 106 function as output terminals. However, other members connected respectively to the end plates 104 and 106 (e.g., electrically conductive plates disposed respectively between the end plate 104 and the electricity generation unit 102 and between the end plate 106 and the electricity generation unit 102) may function as output terminals.

In the above embodiments, spaces between the outer circumferential surfaces of shaft portions of the bolts 22 and the inner circumferential surfaces of the communication holes 108 are utilized as manifolds. However, axial holes may be formed in the shaft portions of the bolts 22 for use as the manifolds. Also, the manifolds may be provided separately from the communication holes 108 into which the bolts 22 are inserted.

In the above embodiments, in the case where two electricity generation units 102 are disposed adjacent to each other, the adjacent two electricity generation units 102 share a single interconnector 150. However, even in such a case, two electricity generation units 102 may have respective interconnectors 150. Also, in the above embodiments, the uppermost electricity generation unit 102 in the fuel cell stack 100 does not have the upper interconnector 150, and the lowermost electricity generation unit 102 in the fuel cell stack 100 does not have the lower interconnector 150. However, these interconnectors 150 may be provided without elimination.

In the above embodiments, the cathode-side current collector 134 and the interconnector 150 located adjacent thereto are integrally formed as a unitary member; however, they may be formed as separate members. Also, in the above embodiments, the anode-side current collector 144 may have a structure similar to that of the cathode-side current collector 134; i.e., the anode-side current collector 144 and the adjacent interconnector 150 may be integrally formed as a unitary member. The anode-side frame 140 rather than the cathode-side frame 130 may be an insulator. Also, the cathode-side frame 130 and the anode-side frame 140 may have a multilayer structure.

In the above embodiments, materials used to form the members are provided merely by way of example. Other materials may be used to form the members. For example, in the above embodiments, the interconnector 150 is formed of a Cr-containing metal; however, the interconnector 150 may be formed of another material.

In the above embodiments, the hydrogen-rich fuel gas FG is obtained by reforming city gas. However, the fuel gas FG may be obtained from other materials, such as LP gas, kerosene, methanol, and gasoline, or pure hydrogen may be utilized as the fuel gas FG.

In the present specification, a structure in which a member (or a certain portion of the member; the same also applies in the following description) B and a member C face each other with a member A intervening therebetween" is not limited to a structure in which the member A is adjacent to the member B or the member C, but includes a structure in which another component element intervenes between the member A and the member B or between the member A and the member C. For example, a structure in which another layer intervenes between the electrolyte layer 112 and the cathode 114 can be said to be a structure in which the cathode 114 and the anode 116 face each other with the electrolyte layer 112 intervening therebetween.

In the above embodiments (or modifications; the same also applies in the following description), each of the composite bodies 103 included in the fuel cell stack 100 is configured to have the interconnector 150 including the substrate 156 covered with the first coating 136 and the second coating 137. If at least one composite body 103 included in the fuel cell stack 100 has such a configuration, impairment of the sealing performance of the fuel gas flow channel, which would otherwise occur due to reduction reaction between the first coating 136 and the fuel gas FG, can be prevented.

The above embodiments refer to SOFC for generating electricity by utilizing the electrochemical reaction between hydrogen contained in fuel gas and oxygen contained in oxidizer gas; however, the present invention is also applicable to an electrolysis cell unit which is the smallest unit of a solid oxide electrolysis cell (SOEC) for generating hydrogen by utilizing the electrolysis of water, and to an electrolysis cell stack having a plurality of electrolysis cell units. Since the structure of the electrolysis cell stack is publicly known as described in, for example, Japanese Patent Application Laid-Open (kokai) No. 2014-207120, detailed description thereof is omitted, but schematically, the electrolysis cell stack has a structure similar to that of the fuel cell stack 100 in the above embodiment. That is, the fuel cell stack 100 in the above embodiment may be read as "electrolysis cell stack," and the electricity generation unit 102 may be read as "electrolysis cell unit." However, in operation of the electrolysis cell stack, voltage is applied between the cathode 114 and the anode 116 such that the cathode 114 is a positive electrode (anode), whereas the anode 116 is a negative electrode (cathode), and water vapor is supplied as material gas through the communication hole 108. As a result, the electrolysis of water occurs in the electrolysis cell units, whereby hydrogen gas is generated in the anode chambers 176, and hydrogen is discharged to the outside of the electrolysis cell stack through the communication hole 108. Even in the electrolysis cell unit and the electrolysis cell stack having the above structures, impairment of the sealing performance of the fuel gas flow channel, which would otherwise occur due to reduction reaction between the first coating 136 and the fuel gas FG, can be prevented through employment of a structure similar to that of the above embodiments; i.e., a structure such that the composite body has the interconnector 150 including the substrate 156 covered with the first coating 136 and the second coating 137.

DESCRIPTION OF REFERENCE NUMERALS

22: bolt; 24: nut; 26: insulation sheet; 27: gas passage member; 28: body portion; 29: branch portion; 100, 100A: fuel cell stack; 102: electricity generation unit; 103, 103A, 103X: composite body; 104, 106: end plate; 108: communication hole; 108A: cathode chamber communication hole; 108B: anode chamber communication hole; 110: unit cell; 112: electrolyte layer; 114: cathode; 116: anode; 120: separator; 121: hole; 124: bonding member; 130: cathode-side frame; 130A: inner peripheral wall; 130B: outer peripheral wall; 131: hole; 132: oxidizer gas supply communication hole; 133: oxidizer gas discharge communication hole; 134: cathode-side current collector; 135: current collector element; 136: first coating; 137, 137A: second coating; 138: bonding layer; 140: anode-side frame; 141: hole; 142: fuel gas supply communication hole; 143: fuel gas discharge communication hole; 144: anode-side current collector; 145: electrode facing portion; 146: interconnector facing portion; 147: connection portion; 149: spacer; 150: interconnector; 151, 151X: first surface; 152, 152A: first surface region; 153, 153A: second surface region; 154: surface region; 156: substrate; 157, 157A: first substrate region; 158, 158A: second substrate region; 161: oxidizer gas introduction manifold; 162: oxidizer gas discharge manifold; 166: cathode chamber; 171: fuel gas introduction manifold;

172: fuel gas discharge manifold; 176: anode chamber; 240: glass sealing; FG: fuel gas; FOG: fuel offgas; OG: oxidizer gas; and OOG: oxidizer offgas.

The invention claimed is:

1. An electrochemical reaction cell stack comprising:
a plurality of interconnector-electrochemical reaction unit cell composite bodies, at least one of the interconnector-electrochemical reaction unit cell composite bodies is an interconnector-electrochemical reaction unit cell composite body comprising:
 an electrochemical reaction unit cell including an electrolyte layer, and a cathode and an anode which face each other in a first direction with the electrolyte layer intervening therebetween; and
 an interconnector which has a first through hole defining a fuel gas flow channel and which interconnector is disposed on the anode side of the electrochemical reaction unit cell; and
a sealing member which forms a fuel gas flow channel and which sealing member is disposed between the interconnector of one of two adjacent interconnector-electrochemical reaction unit cell composite bodies among the plurality of interconnector-electrochemical reaction unit cell composite bodies and the other interconnector-electrochemical reaction unit cell composite body, the electrochemical reaction cell stack being characterized in that:
the interconnector of the one interconnector-electrochemical reaction unit cell composite body includes a coating forming a first surface of the interconnector, the first surface being located on a side of the interconnector opposite the anode; and
the coating includes a first coating and a second coating having reduction resistance higher than that of the first coating, the first coating forming a first surface region which is a portion of the first surface of the interconnector and is located away from the first through hole, the second coating forming a second surface region which is a portion of the first surface of the interconnector, which second surface region surrounds the first through hole, and which second surface region is located between the first coating and the first through hole; and
the inner peripheral contour of the first coating is located outward of the inner peripheral contour of the sealing member as viewed in the first direction; and
the second coating contains chromia.

2. The electrochemical reaction cell stack according to claim 1, wherein the electrochemical reaction unit cell included in each of the interconnector-electrochemical reaction unit cell composite bodies is a fuel cell unit cell.

3. The electrochemical reaction cell stack according to claim 1, wherein the interconnector has a second through hole defining an oxidizer gas flow channel, and the first surface region includes a surface region surrounding the second through hole.

4. The electrochemical reaction cell stack according to claim 1, wherein the electrolyte is formed of a solid oxide.

5. The electrochemical reaction cell stack according to claim 1, wherein the outer peripheral contour of the second coating is located inward of the outer peripheral contour of the sealing member as viewed in the first direction.

* * * * *